Oct. 31, 1967 L. R. KAHN 3,350,645

COMPATIBLE SINGLE-SIDEBAND SYSTEM WITH SYNTHESIZED PHASE MODULATING WAVE

Filed Nov. 30, 1964 2 Sheets-Sheet 1

INVENTOR.
LEONARD R. KAHN
BY Graybeal, Cole & Barnard
ATTORNEYS

INVENTOR.
LEONARD R. KAHN
BY Graybeal, Cole & Barnard
ATTORNEYS

United States Patent Office 3,350,645
Patented Oct. 31, 1967

3,350,645
COMPATIBLE SINGLE-SIDEBAND SYSTEM WITH SYNTHESIZED PHASE MODULATING WAVE
Leonard R. Kahn, 81 S. Bergen Place, Freeport, N.Y. 11520
Filed Nov. 30, 1964, Ser. No. 414,712
16 Claims. (Cl. 325—137)

ABSTRACT OF THE DISCLOSURE

Method and means for developing a complex audio wave for phase modulating a radio frequency carrier wave, such complex audio wave being produced by splitting an audio signal input into three components, two of which are in quadrature relation to each other and shifted in phase about 45° relative to the third. The frequency of such third segment is then doubled, doubling the phase shift thereof with respect to one of the other segments. These two segments are then combined and the combined signal is used to phase modulate a radio frequency carrier wave. With the carrier wave amplitude modulated by the remaining audio segment, the resulting wave has the characteristics of a so-called compatible single sideband wave. An aspect of the invention is the frequency doubler circuit, which is wideband and comprises a full wave rectifier with a nonlinear network accentuating the second harmonic output.

The present invention relates to improvements in electromagnetic energy transmission systems of the single-sideband type wherein the signal is receivable by either single-sideband or double-sideband receivers, i.e. what is known as compatible single-sideband (CSSB) systems. In general, the present invention relates to means of and methods for synthesizing the necessary phase modulating component to develop such compatible single-sideband signal. More particularly, the present invention develops in audio frequency stages the necessary audio signals for modulation of a carrier to have the desired phase modulation characteristics as well as envelope characteristics for compatible single-sideband transmission. Yet another aspect of the present invention relates to wide band frequency doubler means for developing the second harmonic component utilized in the phase modulation system of the present invention.

The basic advantages and distinguishing characteristics of so-called compatible single-sideband transmission are discussed in my U.S. Pat. No. 2,989,707, granted June 20, 1961, and in the National Association of Broadcasters Engineering Handbook, 1960, at pages 8–41 through 8–52, for example. In the basic system disclosed in said U.S. Pat. No. 2,989,707, a conventional full carrier single-sideband wave is first generated, then the phase modulation component of such wave is isolated by means of a limiter circuit, after which such phase modulation component is then multiplied by a factor of about 1.4 to provide an approximation of the theoretically optimum phase modulation characteristic for a compatible single-sideband signal. In such a system, and as also discussed in said U.S. Pat. No. 2,989,707, the desired envelope component may be generated by a number of methods, but the method generally preferred is to demodulate the full carrier single-sideband wave by use of a product demodulator, with the resulting audio wave being fed to the carrier modulator in the transmitter to provide the desired envelope characteristic of a compatible single-sideband signal. An improved technique for obtaining appropriate multiplication of the phase modulation component of such a system is also disclosed in my U.S. Pat. No. 3,012,209, granted Dec. 5, 1961, such improved technique involving multiplication of the phase modulation component derived from the conventional full carrier single-sideband wave by a factor of seven, then division thereof by a factor of five, to provide the desired multiplication factor of 1.4.

Yet a further improvement as to development of a close approximation of the optimum phase modulation characteristic in a compatible single-sideband modulation system is disclosed in my U.S. Patent No. 3,212,008, entitled Improved Compatible Single-Sideband System, filed June 14, 1961, and issued Oct. 12, 1965. This further improved system in general involves an increase of the phase modulation component of a conventional full carrier single-sideband wave by adding the phase modulation component from a full carrier single-sideband wave to a carrier plus sideband wave having the carrier at twice the peak level of the sideband, with the summation of the two phase modulation components (i.e. what is termed in said patent the "1.0 PM plus 0.5 PM" output), providing an extremely good approximation of the optimum phase modulation characteristic desired for compatible single-sideband transmission. Said Patent 3,212,008 provides at FIG. 1 thereof a graphical comparison of the phase modulation characteristics of the optimum CSSB three-tone wave as well as the phase modulation characteristics of the modified phase modulation components developed by these prior modulation techniques. The comparative phase modulation characteristics of the phase modulation component developed by the present invention also can be readily obtained by comparing the wave shape shown at FIG. 1G hereof with the graphical presentations at said FIG. 1 of said U.S. Patent No. 3,212,008.

According to the present invention, the phase modulation component of the compatible single-sideband wave is produced in a manner not requiring the initial generation of the conventional full carrier single-sideband wave, the necessary phase modulation characteristics being generated by synthesis of the phase modulating signal while the signal is at audio frequency (AF), as distinguished from the prior techniques involving modification of the phase modulation characteristics of a single-sideband signal while the signal is at radio frequency (RF). According to the present invention, a second order harmonic of a segment of the input audio signal is generated, and such second harmonic component is added to the fundamental audio wave in proper phase and proportion to yield the desired complex phase modulating wave.

In general, according to the present invention, the complex audio wave used for phase modulating the radio frequency carrier wave of a compatible single-sideband system is produced by first splitting the audio signal input into three components or segments, two of which are in quadrature relation to each other and shifted about 45° relative to the third, i.e. two such audio signal segments are respectively established at a phase of +45° and −45° relative to the third such audio segment. The frequency of such third signal segment is then doubled which doubles the phase shift thereof with respect to one of the other segments, and the doubled frequency signal is combined with such other segment in a manner to provide a general approximation of the desired phase modulating wave, which then phase modulates the carrier wave. The remaining such audio segment is then employed to amplitude modulate the thus phase modulated carrier wave, with the resulting phase modulated and amplitude modulated wave having at full modulation essentially the well-known characteristics of a compatible single-sideband wave, i.e., a somewhat reduced carrier, a first order sideband, and a relatively smaller but substantial second order sideband.

It is an important feature and advantage of the present invention that the audio signal for phase modulating the carrier in the desired manner for providing the carrier with the phase modulation necessary for compatible single-sideband transmission involves simply the summation of simple, harmonically related waves, rather than the summation of two complex radio frequency waves to get a further complex wave, which is the case in the modulation technique disclosed in my said U.S. Patent No. 3,212,008. It is a further and related important feature of the present invention that the wideband phase shift network, for establishing the various audio signal segments in proper relative phase relationship as employed in the modulation system of the present invention, need have a bandwidth only equal to the audio frequency fundamentals over the operating audio frequency range of the system, as distinguished from a modulation system wherein the audio signals or segments thereof are distorted prior to being shifted in phase relative to one another, in which latter case the phase shift network must of course have a bandwidth sufficient to accommodate not only the fundamental frequencies but also the harmonics involved.

Yet other objects, features and advantages of the modulation technique of the present invention are that the circuitry is relatively quite simple and inexpensive, and easy to maintain in the field, since various operating adjustments as to signal levels and relative phasing are applied to the various signal segments while at audio frequency.

Still another object and feature of the present invention is the provision of a simple, wide band audio frequency doubler, readily spanning and having a uniform response characteristic over the whole audio frequency range of the equipment, in contrast to conventional frequency doublers of the type having output filter means, which are impractical if the range of audio frequencies to be passed by the doubler are to vary more than an octave.

Other objects, features, advantages and characteristics of the various system components and operating techniques pertaining to the present invention will be apparent from the following consideration of a typical compatible single-sideband transmitter embodying same, taken together with the accompanying illustrations thereof, wherein.

Figures 1, 1A, 1B, 1C, 1D, 1E, 1F, 1G, 1H, 1I:
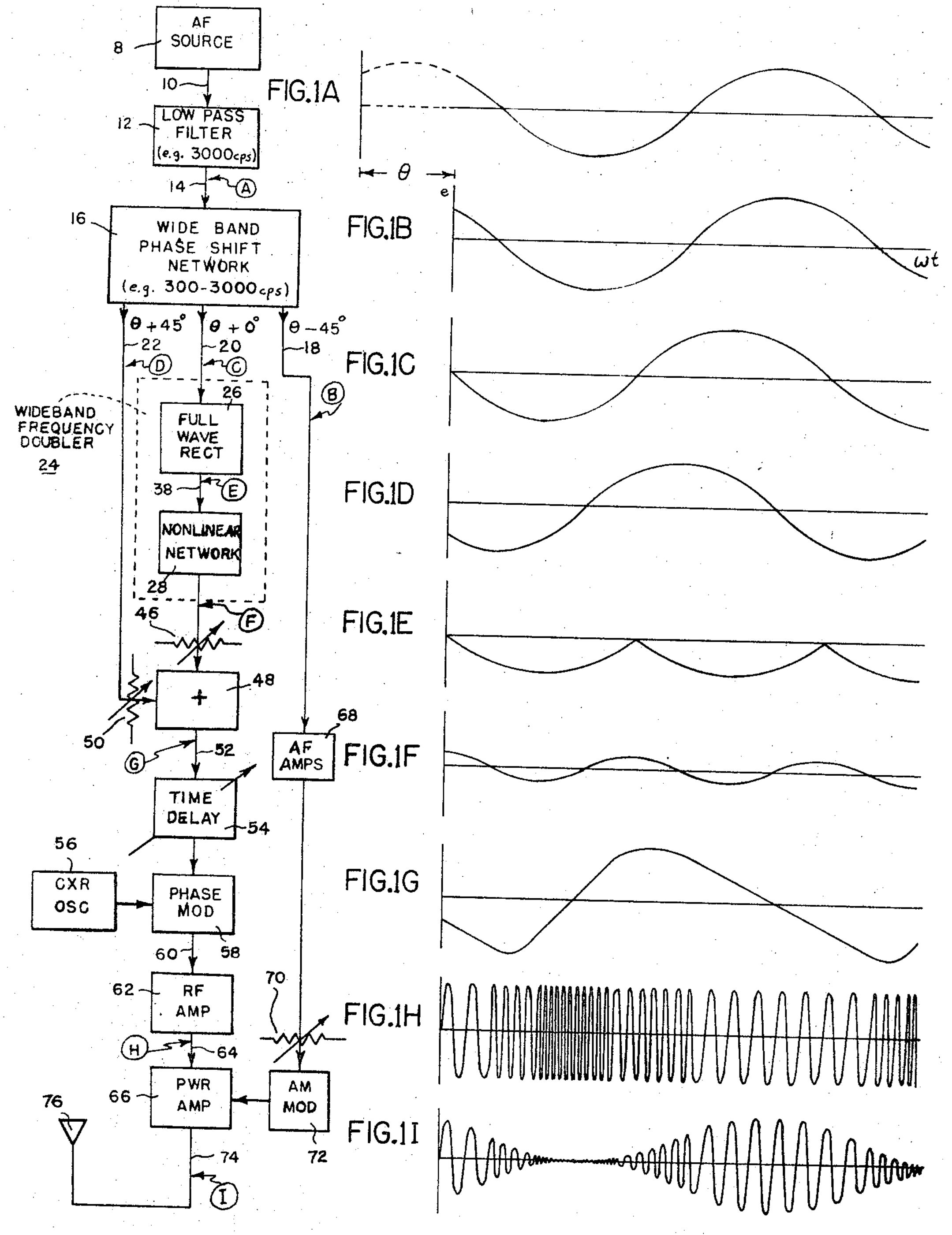
FIG. 1 is a block diagram showing of a compatible single-sideband transmitter incorporating the principles of the invention.
FIGS. 1A, 1B, 1C, 1D, 1E, 1F, 1G, 1H and 1I are various graphical presentations collectively showing the various waveform relationships throughout the transmitter shown at FIG. 1, at respective circuit points A through I thereof.

In FIG. 1, the audio frequency input to the system is derived from a suitable audio frequency source 8, conventional per se, such as a microphone, facsimile unit, or teletype. Preferably, the output 10 from such audio frequency source 8 is fed through a low pass filter 12, providing an output 14 (also see waveform 1A) which has a pass characteristic conforming to the allocated bandwidth for which the system is designed to operate. In a typical case, here selected simply by way of example, such low pass filter 12 has a cutoff frequency of about 3000 cycles per second (c.p.s.), corresponding to an allocated bandwidth of 6 kilocycles per second (k.c.s.).

Said audio output 14 is in turn fed to a wide band phase shift network 16 (shown schematically at FIG. 2 and discussed in more retail below) which functions to produce three audio output segments 18, 20, 22 (respectively shown at FIGS. 1B, 1C, 1D) which are related in phase so that the phase of output 18 (designated $\theta-45°$) lags output 20 (designated $\theta+0°$) by a relative phase shift of 45°, and output 22 (designated $\theta+45°$) leads said output 20 by a relative phase shift of 45°, said outputs 18 and 22 thereby being established in quadrature relation. In the example selected, the wide band phase shift network schematically shown at FIG. 2 is operable to maintain such phase relationships among the various outputs 18, 20 and 22 over an operating range of frequency inputs of from about 300 to 3000 c.p.s. within a tolerance of about $\pm 1.5°$.

Figure 2:
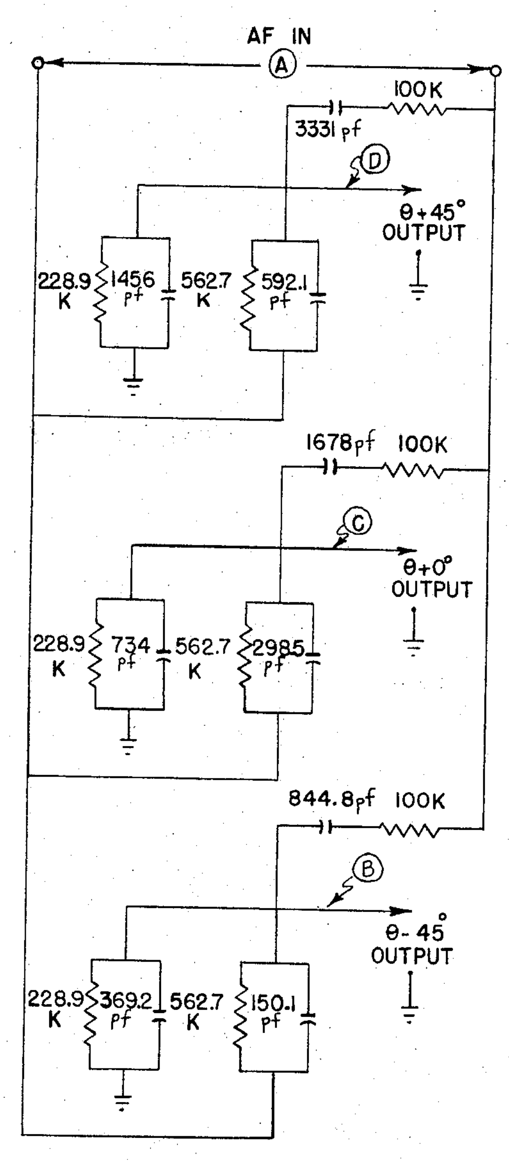
FIG. 2 is a schematic showing of a typical wide band phase shift network as employed in the transmitter shown at FIG. 1.

The schematic showing at FIG. 2 of a suitable phase shift network is self-contained with respect to suitable phase shift network is self-contained with respect to suitable circuit component values for this network over the indicated operating range. As will be readily understood, while the common delay ($\theta$) for the various output segments 18, 20, 22 of the network 16 varies as a function of the input frequency, the respective relative phase shifts of these outputs are maintained substantially constant over the entire operating frequency range for which the network is designed. As will also be understood, the controlling design principles with respect to suitable wide band phase shift networks of this type are well-known per se, and such a network as will provide the desired three outputs 18, 20, 22 over any assigned audio frequency range can be readily obtained. Typical literature sources discussing the design of such wide band phase shift networks include an article entitled "Normalized Design of 90° Phase-Difference Networks," by S. D. Bedrosian, appearing in IRE Transactions Of The Professional Group On Circuit Theory, Vol. CT-7, No. 2, pages 128–136 (June 1960), and the bibliographical references therein.

Figure 3:
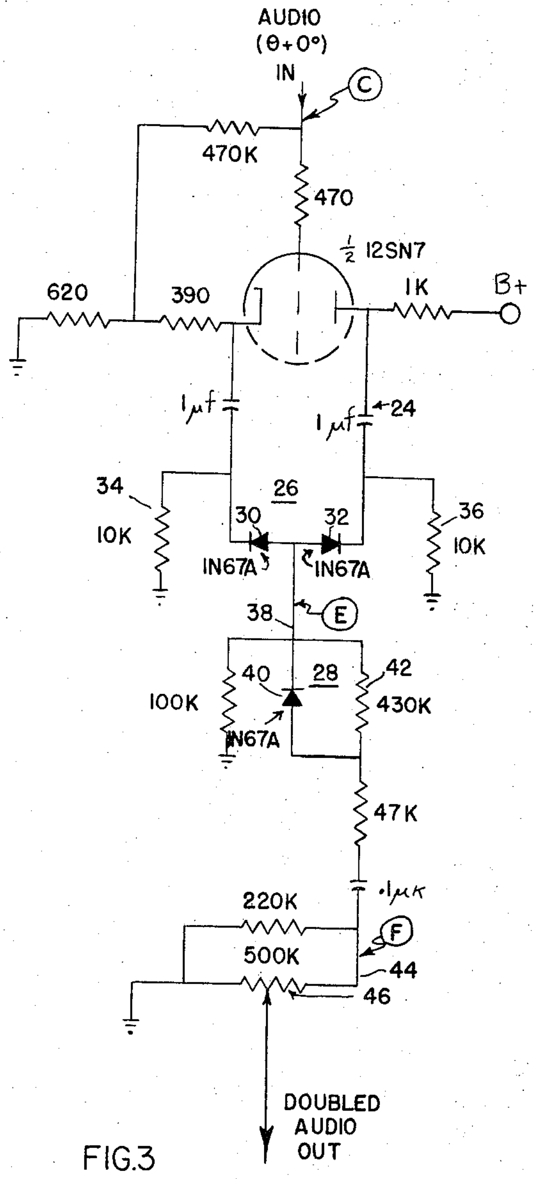
FIG. 3 is a schematic showing of a typical frequency doubler circuit as employed in the transmitter shown at FIG. 1.

As shown in FIG. 1, the $\theta+0°$ audio segment appearing at output 20 is fed to a wide band frequency doubler 24 composed of a full wave rectifier 26 and a nonlinear network 28. Typical circuit components for the frequency doubler 24 are shown at FIG. 3, with self-contained component values. In FIG. 3, diodes 30, 32 and respective resistors 34, 36 comprise the full wave rectifier 26 and produce from the fundamental input (FIG. 1C), an output 38 (shown at FIG. 1E) which is made up of only even harmonic components of the fundamental input, with the second harmonic component predominating. This complex harmonic output 38 is in turn fed to the nonlinear network 28, comprising diode 40 and resistor 42, the function of such nonlinear network 28 being to in effect greatly attenuate all but the second harmonic of the waveform shown at FIG. 1E, and provide an output 44 (as shown at FIG. 1F) which is essentially composed of the second harmonic of the fundamental input to the frequency doubler 24 (i.e. the fundamental shown at FIG. 1C). As will be apparent, the transfer characteristics of the nonlinear network 28 can be varied substantially by appropriate design to include to varying extents even harmonic components above the second harmonic component if desired, but for purposes of the present illustrative embodiment of the invention, such circuit has been designed to realize an output waveform (again note FIG. 1F) which is composed essentially entirely of the second harmonic of the $\theta+0°$ audio input segment fed thereto.

Such doubled frequency audio output 44, with suitable adjustment in relative amplitude as provided by variable harmonic level adjustment potentiometer 46, is then passed to summation circuit 48, wherein it is combined with the $\theta+45°$ output 22 (FIG. 1D) from the network 16, which latter input to summation circuit 48 is also variable as to relative amplitude by means of fundamental level adjustment potentiometer 50 (FIG. 1). The combined output 52 (as shown at FIG. 1G) from summation circuit 48 is a complex audio wave which generally approximates the desired phase modulation characteristic necessary for a compatible single-sideband wave.

The complex audio wave at output 52, after being fed through a variable time delay circuit 54, is employed to phase modulate a carrier wave input from carrier oscillator 56 in phase modulator 58, the output 60 from which, after suitable amplification in one or more RF amplifier stages 62, yields the phase modulated radio frequency output 64, as shown at FIG. 1H, with frequency reduced and frequency variation greatly exaggerated for clarity of illustration. This output 64 is in turn amplitude modulated in power amplifier 66 to provide the desired envelope characteristics for a compatible single-sideband wave, as shown at FIG. 1I, again with frequency reduced and frequency difference exaggerated in like manner as in FIG. 1H, for clarity of illustration.

Carrier envelope modulation in the system shown at FIG. 1 is realized by amplitude modulation of the phase modulated output 64 in power amplifier 66 by employment of the $\theta-45°$ audio output segment 18, which, after passing through one or more audio amplifier stages 68 and being suitably adjusted as to level by means of variable amplitude modulation level adjustment potentiometer 70, is delivered to amplitude modulator 72 which amplitude modulates the phase modulated carrier wave in power amplifier 66, after which the CSSB wave is radiated from antenna 76. As will be understood, this mode of amplitude modulation of the phase modulated carrier wave is conventional per se in prior compatible single-sideband systems, and the output 74 from power amplifier 66 is the characteristic compatible single-sideband wave in that the carrier is phase modulated (by the complex audio wave output 52, FIG. 1G) and amplitude modulated (by network audio output segment 18, FIG. 1B) to have the indicated characteristic compatible single-sideband components.

As will be apparent, the relative phases of the various audio inputs shown at FIG. 1 and FIGS. 1A–1I pertain to the transmitter operating on an upper sideband (USB) mode. A lower sideband (LSB) mode of transmission can be realized simply by reversed connection of the outputs 18, 22, i.e. utilization of output 18 as the fundamental for the phase modulation component and utilization of output 22 as the amplitude modulation component.

As will also be evident, the compatible single-sideband signal realized by this system is applicable to narrow band frequency modulation type transmissions, since the phase modulation component at below 75% or 80% modulation is relatively clean, and can be received without noticeable distortion on an FM receiver if the receiver utilizes de-emphasis, as is usually the case.

Rather than a conventional phase modulator 58, a compatible single-sideband transmitter according to the present invention can also make use of a frequency modulator in conjunction with an audio circuit having a rising frequency characteristic, which has the overall effect of producing a phase modulated carrier wave. Since such circuit is functionally a phase modulator, the terms "phase modulator," or "phase modulation," or "means phase modulating," with respect to the modulation of the carrier with the complex audio wave (FIG. 1G), are used generically herein to also include this latter mode of modulation.

With respect to the relative amplitude of the fundamental audio segment and the second harmonic fed to summation circuit 48, and while the optimum in this regard involves the harmonic having about 25% of the amplitude of the fundamental, it has been found that the relative amplitude of the second harmonic in many cases can be varied in the range of about 20%–30%.

In connection with the nature of the complex audio wave shown at FIG. 1G, it is to be noted that while this wave varies substantially from the theoretical optimum (as shown in FIG. 1 of said U.S. Patent No. 3,212,008), particularly in that the relatively abrupt portion thereof is not as abrupt as the vertical portion of the theoretical optimum characteristic, such variation from optimum of the FIG. 1G wave occurs at a time when the carrier energy of the transmitted wave (FIG. 1I) is the least, so the approximation provided by the FIG. 1G waveform is actually considerably better in overall performance characteristics than might otherwise appear, and is a quite acceptable approximation for at least many applications of the compatible single-sideband system.

As earlier indicated, it is also considered to be within the scope of the present invention that the harmonic component (FIG. 1F) combined with the fundamental component (FIG. 1D) to make up the desired audio phase modulation characteristic can include higher order even harmonics in addition to the second harmonic, if desired to render the phase modulating wave (FIG. 1G) a closer approximation to the theoretical optimum, in which case the wide band frequency doubler 24 in effect is operated at a mode so that not only is it a frequency doubler but also a generator of a group of even harmonic frequencies, with appropriate relative attenuation of the various harmonics to realize the complex wave desired.

Expressed mathematically, and taking the case where the second harmonic is 25% of the fundamental, the desired wave (such as shown at FIG. 1G), at full modulation, is describable as follows:

$$\underset{\text{USB}}{e_{(t)}}=A\left(\sin W_A t-\frac{\pi}{4}\right)-.25A\cos 2W_A t$$

or $$\underset{\text{LSB}}{e_{(t)}}=A\left(\sin W_A t+\frac{\pi}{4}\right)-.25A\cos 2W_A t$$

where $W_A$ is the angular velocity of the audio frequency input $f_A$, and $t$ is time in seconds.

With respect to the wide band frequency doubler here presented, it will be evident that such also has independent utility in other audio frequency conversion applications, such as in electric organ circuits for octave generation, or such as in conjunction with a bandwidth compression system where the doubler is employed to restore the audio signal to its initial frequencies. Yet another manner of utilization of such an audio frequency doubler circuit is in conjunction with a tape recorder audio output circuit where a tape is played back at half the speed as at 3¾ inches per second) at which the tape was recorded (as at 7½ inches per second), in which case the passing of the audio signal output through the frequency doubler in effect restores the played back audio signal to its proper frequencies.

From the foregoing, various other modifications, adaptations, and applications of the modulation techniques and circuit arrangements of the present invention will appear to those skilled in the art to which the invention is addressed, within the scope of the following claims.

What is claimed is:

1. The method of synthesizing an audio signal for phase modulating a carrier wave to have the phase modulation characteristics desired for compatible single-sideband transmission, said method comprising:

(a) generating an audio signal;

(b) deriving from said audio signal two phase shifted audio signal segments, the first such segment having a relative phase shift of 0°, with the second such segment having a phase shift of about 45° relative to such first segment;

(c) doubling the frequency of said first signal segment;

(d) combining such second segment and the doubled frequency signal to provide a complex audio signal composed principally of said second phase shifted segment and also including to a minor degree the second harmonic of said first phase shifted segment; and (e) phase modulating a radio frequency carrier wave with the combined signal.

2. The method of claim 1, wherein said phase shifted audio signal segments have a frequency range of at least about 300–3000 cycles per second.

3. The method of claim 1, wherein such doubled frequency signal has an amplitude of about 20–30% relative to the audio signal segment with which it is combined.

4. The method of claim 3, wherein such relative amplitude is about 25%.

5. Means synthesizing an audio signal for phase modulating a carrier wave to have the phase modulation characteristic desired for compatible single-sideband transmission, said means comprising:

(a) a source of audio frequencies;

(b) a wide band phase shift network developing two phase shifted audio signal segments from an audio signal input from said source, the first such segment having a relative phase shift of 0°, with the second such segment having a phase shift of about 45° relative to such first segment;

(c) means doubling the frequency of said first signal segment;

(d) a combiner wherein such second segment and the doubled frequency signal are summated to provide a complex audio signal composed essentially of the fundamental wave contributed by said second phase shifted segment and to a minor degree by the second harmonic of said first phase shifted segment; and (e) means phase modulating a radio frequency carrier wave with the combined signal.

6. The means of claim 5, wherein said wide band phase shift network has a bandwidth of at least about 300–3000 cycles per second, and such frequency doubling means has a bandwidth of at least about 600–6000 cycles per second.

7. The means of claim 5, comprising means establishing the amplitude of said doubled frequency signal at about 20–30% of the amplitude of the fundamental wave with which it is combined.

8. The means of claim 7, comprising means establishing the amplitude of the doubled frequency signal at about 25% of the amplitude of the fundamental wave with which it is combined.

9. The method of generating a compatible single-sideband wave essentially characterized at full modulation by a somewhat reduced carrier ,a first order sideband and a relatively smaller but substantial second order sideband, said method comprising:

(a) generating an audio signal;

(b) deriving from said audio signal three phase shifted audio signal segments, the first such segment having a relative phase shift of 0°, with the second such segment having a phase shift of about 45° relative to such first segment, and the third such segment also having a phase shift of about 45° relative to said first segment, and in quadrature relation to said second segment;

(c) doubling the frequency of said first signal segment;

(d) combining such second segment and the doubled frequency signal to provide a complex audio wave composed essentially of a fundamental wave contributed by said second phase shifted segment and to a minor degree by the second harmonic of said first phase shifted segment;

(e) generating a carrier wave;

(f) phase modulating said carrier wave with said complex audio wave;

(g) amplitude modulating the phase modulated carrier wave with said third phase shifted segment to produce a compatible single sideband wave; and (h) radiating such compatible single-sideband wave.

10. The method of claim 9, wherein such relative phase shift between said audio signal segments, and the frequency doubling of said first signal segment are applied to signal segments over a bandwidth of at least about 300–3000 cycles per second.

11. The method of claim 10, wherein said doubled frequency signal has an amplitude of about 20–30% relative to the fundamental wave with which it is combined.

12. The method of claim 11, wherein such relative amplitude is about 25%.

13. An electromagnetic transmission system for generating a compatible single-sideband wave essentially characterized in full modulation by a somewhat reduced carrier, a first order sideband, and a relatively smaller but substantial second order sideband, said transmitter system comprising:

(a) a source of audio frequencies;

(b) a wide band phase shift network deriving three audio signal segments from an audio signal input from said audio frequency source, two of which segments are in quadrature relation to each other and related in phase to the third by a relative phase difference of 45°;

(c) a frequency doubler deriving from said third audio frequency segment an output which is composed at least principally of the second harmonic of said third segment;

(d) a summation circuit wherein said harmonic output is combined with one of said two audio segments to provide a complex audio wave;

(e) a radio frequency carrier source;

(f) means phase modulating the output of said radio frequency carrier source with said complex wave to provide a phase modulated carrier wave;

(g) means amplitude modulating said phase modulated carrier wave with the other of said two audio frequency segments; and (h) means radiating the thus phase modulated and amplitude modulated carrier wave as a compatible single-sideband signal.

14. The system of claim 13, wherein said wide band phase shift network and such frequency doubling means have a bandwidth of at least about 300–3000 cycles per second.

15. The system of clami 14, comprising means establishing the amplitude of said doubled frequency signal at about 20–30% of the amplitude of the fundamental wave with which it is combined.

16. The system of claim 15, comprising means establishing the amplitude of the doubled frequency signal at about 25% of the amplitude of the fundamental wave with which it is combined.

References Cited

UNITED STATES PATENTS

| | | | |
|---|---|---|---|
| 3,054,073 | 9/1962 | Powers | 332—45 X |
| 3,231,660 | 1/1966 | Munch | 84—1.26 X |
| 3,244,807 | 4/1966 | Richman | 178—6 |
| 3,245,001 | 4/1966 | Barber | 328—14 X |
| 3,261,991 | 7/1966 | Lash | 328—20 X |

OTHER REFERENCES

Villard Jr., Oswald G.: "A Simple Single-Sideband Transmitter"; in Q.S.T., November 1948; pp. 14–17, 112 and 114 (available in the Scientific Library TK 5700.Q2).

JOHN W. CALDWELL, *Primary Examiner.*

DAVID G. REDINBAUGH, *Examiner.*

B. V. SAFOUREK, *Assistant Examiner.*